US006463285B1

(12) United States Patent
Davies et al.

(10) Patent No.: US 6,463,285 B1
(45) Date of Patent: Oct. 8, 2002

(54) ARRANGEMENT FOR DATA EXCHANGE IN A WIRELESS COMMUNICATION SYSTEM

(75) Inventors: Stephen William Davies, Toronto (CA); Michaela C Vanderveen, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/501,418

(22) Filed: Feb. 9, 2000

(51) Int. Cl.[7] .............................................. H04Q 7/20
(52) U.S. Cl. .................... 455/436; 455/445; 455/449
(58) Field of Search ............................... 455/436, 437, 455/438, 439, 442, 443, 444, 445, 449

(56) References Cited

U.S. PATENT DOCUMENTS

| 5,412,654 | A | * | 5/1995 | Perkins ........................ 455/11.1 |
| 5,572,530 | A | * | 11/1996 | Chitre et al. ............... 370/110.1 |
| 5,768,276 | A | * | 6/1998 | Diachina et al. ............. 370/432 |
| 6,061,569 | A | * | 5/2000 | Touzeau et al. ............. 455/455 |
| 6,272,129 | B1 | * | 8/2001 | Dynarski et al. ............ 370/356 |
| 6,275,943 | B1 | * | 8/2001 | Pentikainen et al. ........ 455/426 |

FOREIGN PATENT DOCUMENTS

| WO | WO 98 47302 A | 10/1998 | ............ H04Q/7/38 |

OTHER PUBLICATIONS

European Patent Office Search Report, Application No. EP 01 30 0742, The Hague, Jun. 18, 2001.

* cited by examiner

Primary Examiner—Daniel Hunter
Assistant Examiner—Thuan T. Nguyen
(74) Attorney, Agent, or Firm—Eugene J. Rosenthal

(57) ABSTRACT

The penalties associated with relying on layer-4 to handle packets lost as a result of a handoff can be reduced by forwarding, in response to a handoff request from a first base station to a second base station, at least one layer-2 frame of a layer-3 packet destined to/from the wireless terminal that has been passed down from layer-3 to layer-2, and so is indicated to have been transmitted at layer-3 even though not all of the layer-2 frames of the layer-3 packet have actually been transmitted. In one embodiment of the invention, each of the at least one layer-2 frames may be encapsulated together in a special layer-3 packet that is transferred from the first base to the second base station in the usual manner of inter-base-station communication. Advantageously, packets are not lost at layer-4 due to handoffs. Thus, layer-4 retransmissions are not required, and so delays in the network are reduced. Furthermore, if only the layer-2 frames that were not transmitted over the air to the wireless terminal by the first base station are transferred to the second base station, a savings may be had in use of the air interface.

27 Claims, 2 Drawing Sheets

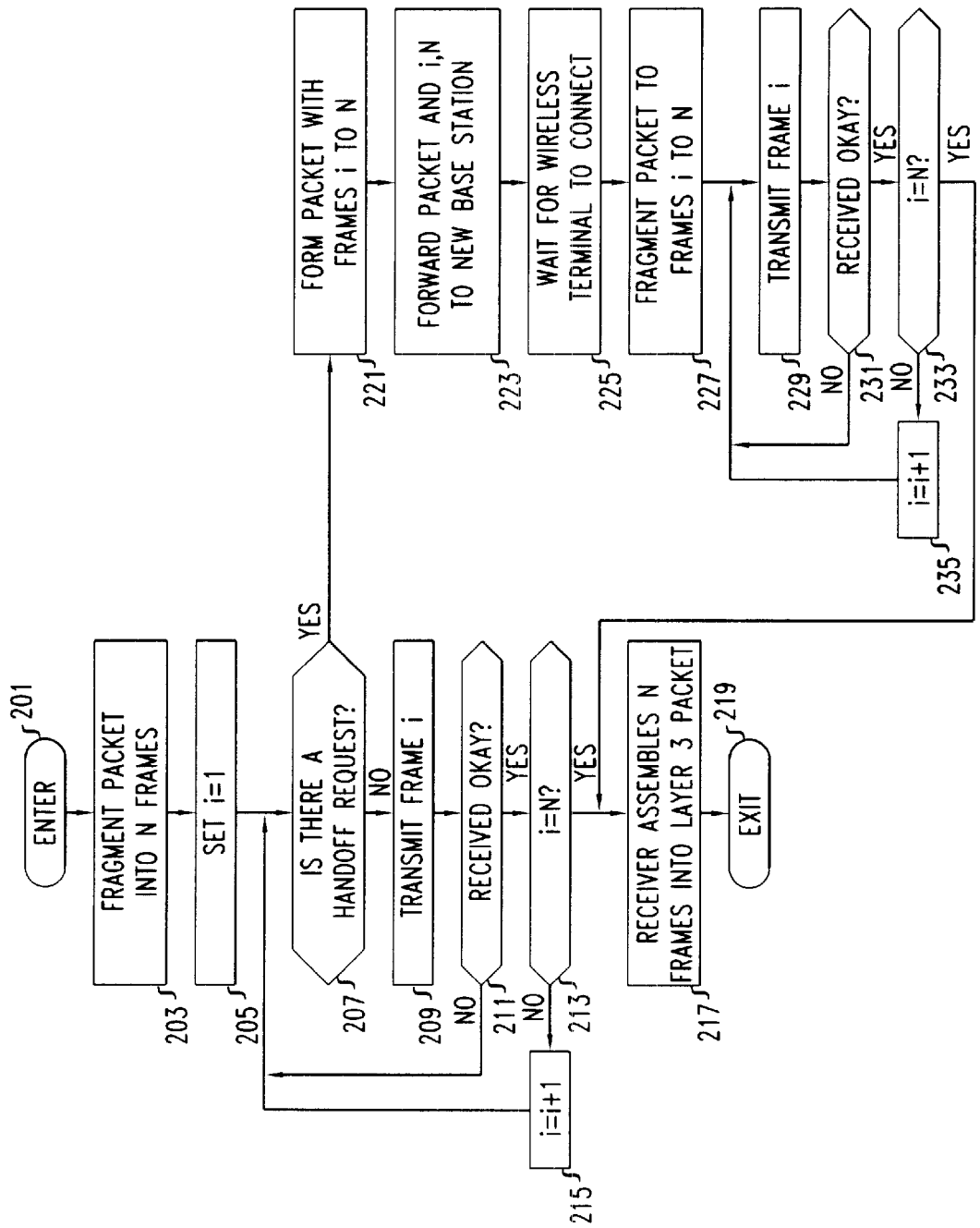

ARRANGEMENT FOR DATA EXCHANGE IN A WIRELESS COMMUNICATION SYSTEM

TECHNICAL FIELD

This invention relates to the art of wireless communication, and more particularly, to a method of improving the quality of data communication at the time of handoff of a call from one base station to another.

BACKGROUND OF THE INVENTION

Prior art wireless systems during wireless data transmission typically rely on the transport layer, or layer-4 in the International Standards Organization (ISO) Open Systems Interconnection (OSI) seven layer reference model for data communications to insure reliable data transfer end-to-end for a data call. Therefore, if a data packet is lost due to a handoff of a wireless terminal from a first base station to a second base station during transmission of the packet, some layer-4 protocols will cause the retransmissions of the packet from its source all the way through the network to the destination. This leads to network delays and additional loading of the network. Other layer-4 protocols are not designed to retransmit lost packets, resulting in a gap in the data at the destination. Thus, with either protocol type there is a penalty associated with relying on layer-4 to handle packets lost as a result of a handoff.

SUMMARY OF THE INVENTION

We have recognized that the penalties associated with relying on layer-4 to handle packets lost as a result of a handoff can be reduced, in accordance with the principles of the invention, by forwarding, in response to a handoff request from a first base station to a second base station, at least one layer-2 frame of a layer-3 packet that is destined to/from the wireless terminal that has been passed down from layer-3 to layer-2, and so is indicated to have been transmitted at layer-3 even though not all of the layer-2 frames of the layer-3 packet have actually been transmitted. In one embodiment of the invention, each of the at least one layer-2 frames may be encapsulated together in a special layer-3 packet that is transferred from the first base to the second base station in the usual manner of inter-base-station communication. Advantageously, packets are not lost at layer-4 due to handoffs. Thus, layer-4 retransmissions are not required, and so delays in the network are reduced. Furthermore, if only the layer-2 frames that were not transmitted over the air to the wireless terminal by the first base station are transferred to the second base station, a savings may be had in use of the air interface.

BRIEF DESCRIPTION OF THE DRAWING

In the drawing:

FIG. 2 shows an exemplary process, in flow chart form, for forwarding, in response to a handoff request from said first base station to said second base station, at least one layer-2 frame of a layer-3 packet destined to/from the wireless terminal that has been passed down from layer-3 to layer-2, and so is indicated to have been transmitted at layer-3 even though not all of the layer-2 frames of the layer-3 packet have actually been transmitted, in accordance with the principles of the invention.

DETAILED DESCRIPTION

Figure 1:
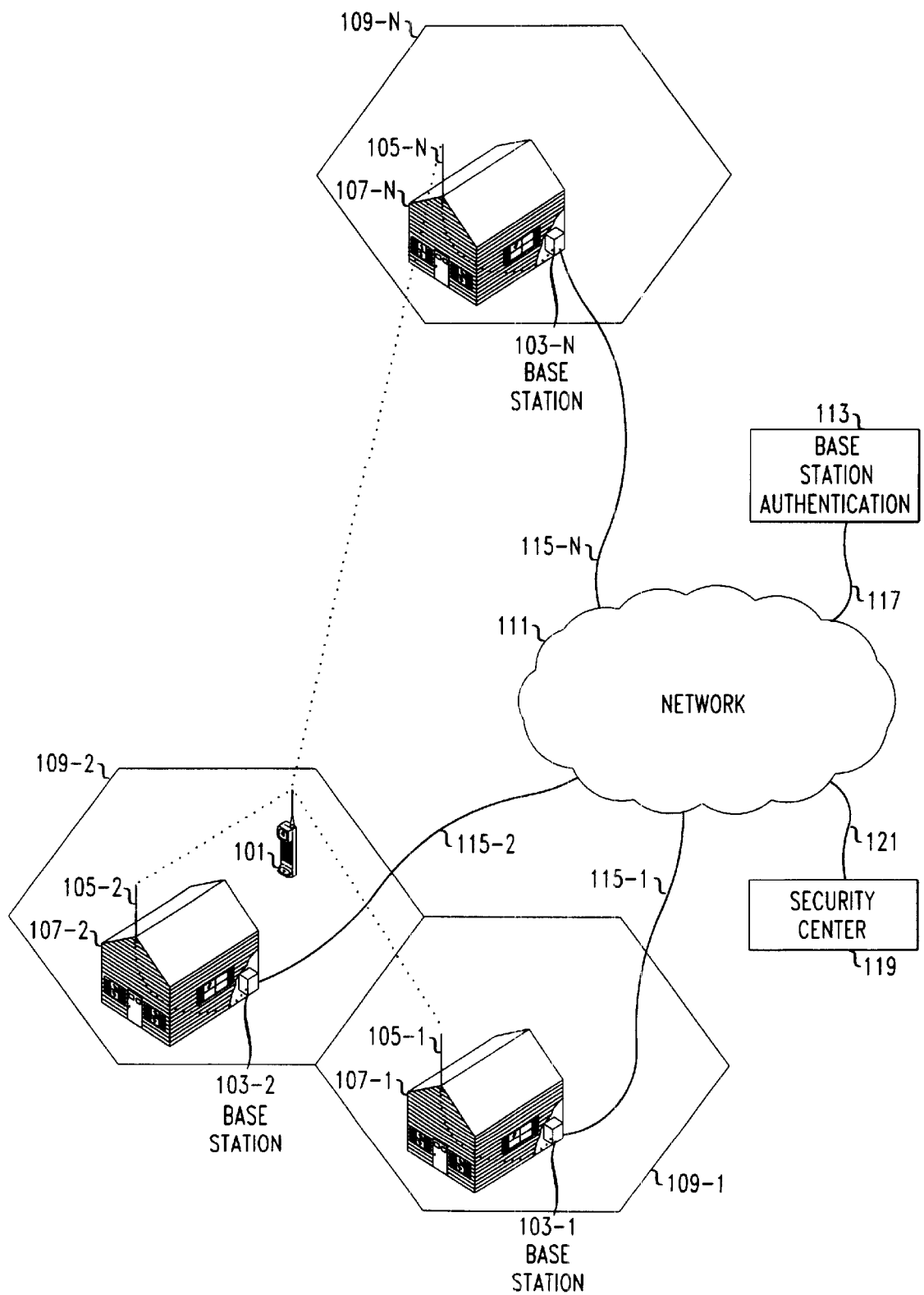
FIG. 1 shows an exemplary network arrangement in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

FIG. 1 shows an exemplary network arrangement in accordance with the principles of the invention. Shown in FIG. 1 are a) wireless terminal 101; b) N base stations 103, where N is an integer greater than or equal to 2, including base station 103-1 through 103-N; c) N antennas 105, including antennas 105-1 through 105-N; d) N structures 107, including structures 107-1 through 107-N; e) N cells 109, including cells 109-1 through 109-N; f) network 111; g) base station authentication unit 113; h) N communication links 115, including communication links 115-1 through 115-N; i) communication links 117 and 121; j) security center 119.

Wireless terminal 101 is able to communicate with multiple base stations which transmit with sufficient signal strength to be detected and useable for communication at the current location of wireless terminal 101. Once a signal of sufficient strength is detected for a particular base station, wireless terminal 101 may engage in communication with that base station. The particular types of wireless link and protocol, i.e., the air interface, employed by wireless terminal 101 are not essential to the invention and may be any type desired by the implementor, although of course the radio link and protocol employed by wireless terminal 101 must be the same type employed by base stations 103.

Wireless terminal 101 may achieve communication with multiple base stations in any manner desired by the implementer. For example, wireless terminal 101 may have only a single receiver, and it may receive signals, when not occupied with the exchange of information with the base station currently serving it, from other base stations that have signals of sufficient strength reaching wireless terminal 101. Alternatively, wireless terminal 101 may receive signals from multiple base stations simultaneously, e.g., by employing multiple parallel receivers in wireless terminal 101. Further alternatively, wireless terminal 101 may have more than one receiver, but the number of receivers is less than the number of base stations from which wireless terminal 101 can receive a signal of sufficient strength at its current location, so wireless terminal 101 needs to perform scanning on at least one of its receivers to obtain signals for some of the base stations.

Base stations 103 are substantially conventional base stations except for the following. First, base stations 103 need not be connected to a dedicated network for inter-base-station communication. Instead, base stations 103 can employ a shared public network, e.g., an internet protocol (IP)-based network such as the Internet. Second, each base station 103 need not contain any "map" information. Instead, each of base stations 103 is capable of discovering its necessary portions of the "map" information. Preferably, base stations 103 are small base stations that can easily be incorporated into a small space, e.g., one that is already available, rather than requiring dedicated construction and site preparation. Advantageously, such small size, coupled with the ability to discover the necessary portions of the "map" information, enable the rapid construction of a new wireless communication network. Furthermore, such a wireless communication network is flexible in its architecture, i.e., base stations can easily be added or removed, and it is also easy to maintain.

Each of antennas 105 are coupled to a respective one of base stations 103. Each of antennas 105 radiates the signal developed by its respective one of base stations 103. Each combination of a one of base stations 103 and its respective one of antennas 105 yields a one of cells 109, which is a particular coverage area. The shape of cells 109 in FIG. 1 do not represent actual cell shapes but instead are merely conventional notation for cells. Note that the shape of the actual various cells 109 are all independent.

Each of structures 107 provides a facility in which to place one or more of base stations 103. Furthermore, structures 107 may also provide a place on which to mount antennas 105. For example, some of structures 107 may be already existing homes in which a one of base stations 103 is located in an unused space and to which a one of antennas 105 is exteriorly affixed.

Network 111 provides a way for base stations 103 to communicate with each other, as well as with base station authentication unit 113 and security center 119. Network 111 may be made up of various subnetworks, which may be networks in their own right. Furthermore, the various subnetworks may be of different types and may employ different protocols. In one embodiment of the invention, network 111 is a packet based network, e.g., an asynchronous transfer mode (ATM) network or an IP network.

Each of base stations 103 is connected to network 111 via a respective one of communication links 115, which may be construed as part of network 111. For example, where network 111, or at least a subnetwork thereof, is an IP network, and one of base stations 103 are located within structures 107 that are homes, communications link 115 may be an Internet connection, e.g., over cable television lines or a fiber-to-the curb connection, that is shared by the base station for communicating with other base stations and by the occupants of the home for Internet browsing.

Base station authentication unit 113 contains a list of all valid base stations 103, and any associated information such as security keys and alternative identifiers or addresses of the base station. A base station may be listed in base station authentication unit 113 at any point. However, the base station only becomes valid once it is listed in base station authentication unit 113. Although shown herein as a single unit, in practice base station authentication unit 113 may be made up of several parts, which need not be geographically collocated. Furthermore, to improve reliability and performance, some or all of the various parts or functions of base station authentication unit 113 may be replicated, as will be readily recognized by those of ordinary skill in the art.

Base station authentication unit 113 is connected to network 111 via communication link 117. Of course, when base station authentication unit 113 is made up of more than one part, or is replicated, communication link 117 is construed as covering all the necessary communications paths between network 111 and the various parts or replicas.

Security center 119 contains a list of all valid wireless terminals that may be served. In addition, security center 119 contains security information, such as authentication challenge-response pairs and/or encryption keys associated with each wireless terminal. The security information may be distributed by security center 119 to base stations 103, as necessary. A wireless terminal may be listed in security center 119 at any point. However, the wireless terminal only becomes valid once it is listed in security center 119. Although shown herein as a single unit, in practice security center 119 may be made up of several parts, which need not be geographically collocated. Furthermore, to improve reliability and performance, some or all of the various parts or functions of security center 119 may be replicated, as will be readily recognized by those of ordinary skill in the art.

Security center 119 is connected to network 111 via communication link 121. Of course, when security center 119 is made up of more than one part, or is replicated, communication link 121 is construed as covering all the necessary communications paths between network 111 and the various parts or replicas.

FIG. 2 shows an exemplary process, in flow chart form, for forwarding, in response to a handoff request from a first base station, e.g., base station 103-1 (FIG. 1) to a second base station, e.g., base station 103-2, at least one layer-2 frame of a layer-3 packet destined to/from the wireless terminal that has been passed down from layer-3 to layer-2—and so is indicated to have been transmitted at layer-3, even though not all of the layer-2 frames of the layer-3 packet have actually been transmitted—in accordance with the principles of the invention. Note that the same process may be advantageously used to reduce the latency of packet transmission from the wireless terminal to the base stations or from the base stations to the wireless terminal.

The process is entered in step 201 (FIG. 2), when layer-3 passes a packet to layer-2 for transmission. In step 203, layer-2 fragments the layer-3 packet into N layer-2 frames. N is a variable integer greater than or equal to 1 that is a function of the frame size and the size of the layer-3 packet, as is well known in the art. Thereafter, a counter variable i is initialized to 1, in step 205. Next, conditional branch point 207 tests to determine if there is a request for a handoff from the first base station that is currently serving the wireless terminal, e.g., base station 103-1 (FIG. 1) to another base station, e.g., base station 103-2. As will be recognized by those of ordinary skill in the art, the source of the request for handoff may be either one of the base stations or the wireless terminal. The particular requester depends on the system architecture and the quality of the signals that are being received by the wireless terminal and the base stations.

If the test result in step 207 is NO, indicating that there has not yet been received a request for handoff, control passes to step 209, in which frame i is transmitted over the wireless link. Conditional branch point 211 tests to determine if the transmitted frame was successfully received. If the test result in step 211 is NO, indicating that some form of error occurred in the transmission of the frame, control passes back to step 207, and the process continues as described above. Doing so will result in retransmissions of the frame.

If the test result in step 211 is YES, indicating that the frame was successfully transmitted, control passes to conditional branch point 213, which tests to determine if i is equal to N. If the test result in step 213 is NO, indicating that there yet remains more frames to transmit for the layer-3 packet, control passes to step 215, in which the value of i is incremented. Control passes back to step 207 and the process continues as described above for the next frame.

If the test result in step 213 is YES, indicating all frames that made up the layer-3 packet have been transmitted, control passes to step 217, in which the receiver assembles all of the received frames back into the layer-3 packet, which is passed up to layer-3. The process then exits in step 219.

If the test result in step 207 is YES, indicating that a handoff from the first base station to a second base station has been requested, control passes to step 221, in which the transmitter assembles the remaining frames, which number N-i+1, into a new, special for the purpose of transmitting the remaining frames, layer-3 packet, in accordance with an aspect of the invention. In step 223, the special layer-3 packet is forwarded to the new base station, using conventional inter base station communication, in accordance with the principles of the invention. Also, in step 223, the values of N and i are transmitted as part of the special layer-3 packet, in accordance with an aspect of the invention. The transport of the special layer-3 packet is achieved in the usual manner of interbase station communication. Thereafter, in step 225, the process waits for the wireless terminal to successfully establish a connection with the second base station. Once a connection is established control passes to step 227.

In step 227, layer-2 refragments the received special layer-3 packet into the previously existing N-i+1 layer-2 frames. Of course, to do this, the values of N and i are first extracted from the special layer-3 packet. In step 229 frame i is transmitted over the wireless link between the new base station and the wireless terminal. Conditional branch point 231 tests to determine if the transmitted frame was successfully received. If the test result in step 231 is NO, indicating that some form of error occurred in the transmission of the frame, control passes back to step 229, and the process continues as described above. Doing so will result in retransmissions of the frame. If the test result in step 231 is YES, indicating that the frame was successfully transmitted, control passes to conditional branch point 233, which tests to determine if i is equal to N. If the test result in step 233 is NO, indicating there yet remains more frames to transmit, control passes to step 235, in which the value of i is incremented. Control passes back to step 229 and the process continues as described above for the next frame.

If the test result in step 233 is YES, indicating that all the frames of the special layer-3 packet have been transmitted over the wireless link, control passes to step 217, and the process continues as described above.

In the embodiment described above, it is assumed, for pedagogical and clarity purposes, that there are no further requests for handoffs during the transmission of the frames received in the new layer-3 packet. However, should an additional handoff request be received, those of ordinary skill in the art will be able to insure that the remaining frames of the special layer-3 packet are forwarded along with the current values of N and i in the same manner as described herein for the frames of the original layer-3 packet.

In other embodiments of the invention, the values of N and i may not be incorporated in the special layer-3 packet transmitted in step 223. For example, the values of N and i may be deduced from the frames already received and the frames received in the new layer-3 packet. Alternatively, the values of N and i may be transmitted in a separate packet.

Note that the process as described in FIG. 2 is from the point of view of the base station to wireless terminal link, i.e., the downlink. Thus, the first base station forwards to the second base the frames that it has not yet transmitted to the wireless terminal station. To use the process for the wireless terminal to base station link, i.e., the uplink, step 223 must be modified to forward to the second base station in the special layer-3 packet the frames that have already been received, as opposed to the frames that have already been sent, by the first base station from the wireless terminal.

What is claimed is:

1. A method for facilitating efficient handoff in a network having at least first and second wireless base stations and at least one wireless terminal, the method comprising the steps of:

receiving a request from said at least one wireless terminal for a handoff from said first base station to said second base station; and in response to said request, forwarding at least one layer-2 frame from said first base station to said second base station for a layer-3 packet that had begun transmitting data between said at least one wireless terminal and said first base station and was indicated at layer-3 to have been transmitted even though at least a portion of said layer-3 packet had not been actually transmitted at layer-2.

2. The invention as defined in claim 1 further including the step of transmitting said layer-2 frame from said second base station to said wireless terminal.

3. The invention as defined in claim 1 wherein said layer-2 frame is a frame that has not already been transmitted between said wireless terminal and a one of said first and second base stations.

4. The invention as defined in claim 1 wherein said layer-2 frame is a frame that has already been transmitted from said wireless terminal to said first base station.

5. The invention as defined in claim 2 wherein said layer-2 frame is transmitted as part of a special layer-3 packet.

6. The invention as defined in claim 5 wherein said special layer-3 packet further includes information from which the number of frames that are in said special layer-3 packet can be determined.

7. The invention as defined in claim 5 wherein said special layer-3 packet further includes an indication of the number of frames that are in said layer-3 packet that had begun transmitting and that was indicated to have been transmitted.

8. The invention as defined in claim 5 wherein said special layer-3 packet further includes an indication of the number of frames already transmitted between said first base station and said wireless terminal.

9. A method for facilitating efficient handoff in a network having at least first and second wireless base stations and at least one wireless terminal, the method comprising the steps of:

transmitting layer-2 frames that made up a layer-3 packet over a wireless link between said first base station and said wireless terminal;

receiving a request from said at least one wireless terminal for a handoff from said first base station to said second base station after transmitting at least one of said layer-2 frames and before all of said layer-2 frames of said layer-3 packet have been transmitted over said wireless link; and in response to said request, transmitting at least one untransmitted layer-2 frame from said first base station to said second base station.

10. The invention as defined in claim 9 wherein said at least one untransmitted layer-2 frame is transmitted from said first base station to said second base station in a layer-3 packet.

11. The invention as defined in claim 9 wherein said at least one untransmitted layer-2 frame is transmitted from said second base station to said wireless terminal.

12. The invention as defined in claim 9 further including the step of transmitting the number of layer-2 frames transmitted in said step of transmitting layer-2 frames.

13. The invention as defined in claim 9 further including the step of transmitting the number of layer-2 frames in said layer-3 packet.

14. A method for facilitating efficient handoff in a network having at least first and second wireless base stations and at least one wireless terminal, the method comprising the step of:

in response to a request for a handoff of said at least one wireless terminal from said first base station to said second base station, forwarding at least one layer-2 frame from said first base station to said second base station for a layer-3 packet that had begun transmitting data between said at least one wireless terminal and said first base station and was indicated at layer-3 to have been transmitted even though at least a portion of said layer-3 packet had not been actually transmitted at layer-2.

15. The invention as defined in claim 14 wherein said layer-2 frame is a frame that has not already been transmitted between said wireless terminal and a one of said first and second base stations.

16. The invention as defined in claim 14 wherein said layer-2 frame is a frame that was already transmitted from said wireless terminal to said first base station.

17. The invention as defined in claim 14 wherein said layer-2 frame is a frame that was not already transmitted from said first base station to said wireless terminal.

18. The invention as defined in claim 14 wherein said handoff request is initiated by said at least one wireless terminal.

19. The invention as defined in claim 14 wherein said handoff request is initiated by said first base station.

20. The invention as defined in claim 14 wherein said handoff request is initiated by said second base station.

21. The invention as defined in claim 14 further including the step of transmitting said layer-2 frame from said second base station to said wireless terminal.

22. The invention as defined in claim 14 further including the step of transmitting an indication of the number of layer-2 frames transmitted in said step of transmitting layer-2 frames.

23. The invention as defined in claim 14 wherein said layer-2 frame is transmitted as part of a layer-3 packet.

24. A method for facilitating efficient handoff in a network having at least first and second wireless base stations and at least one wireless terminal, the method comprising the step of:

in response to initiation of a handoff of said at least one wireless terminal from said first base station to said second base station, forwarding at least one layer-2 frame from said first base station to said second base station for a layer-3 packet that had begun transmitting data between said at least one wireless terminal and said first base station and was indicated at layer-3 to have been transmitted even though at least a portion of said layer-3 packet had not been actually transmitted at layer-2.

25. A method for facilitating efficient handoff in a network having at least first and second wireless base stations and at least one wireless terminal, the method comprising the step of:

forwarding, in response to a request from said at least one wireless terminal for a handoff from said first base station to said second base station, at least one layer-2 frame from said first base station to said second base station for a layer-3 packet that had begun transmitting data between said at least one wireless terminal and said first base station and was indicated at layer-3 to have been transmitted even though at least a portion of said layer-3 packet had not been actually transmitted at layer-2.

26. The invention as defined in claim 25 wherein said, at least one layer-2 frame is transmitted in a layer-3 packet.

27. The invention as defined in claim 25 further including the step of transmitting information indicative of the number of said at least one layer-2 frames in said layer-3 packet.

* * * * *